US012418525B2

(12) United States Patent
Berbenetz et al.

(10) Patent No.: US 12,418,525 B2
(45) Date of Patent: Sep. 16, 2025

(54) TECHNIQUES FOR MAPPING A SMART CARD TO MULTIPLE USER PERSONAS

(71) Applicant: OKTA, INC., San Francisco, CA (US)

(72) Inventors: Valentin Berbenetz, Oakville (CA); Deepa Mahalingam, North Chicago, IL (US); Sandeep Kumar Dhankar, Fremont, CA (US); Yogesh Ashok Dandekar, Santa Clara, CA (US)

( * ) Notice: Subject to any disclaimer, the term of this patent is extended or adjusted under 35 U.S.C. 154(b) by 143 days.

(21) Appl. No.: 18/362,793

(22) Filed: Jul. 31, 2023

(65) Prior Publication Data

US 2025/0047661 A1 Feb. 6, 2025

(51) Int. Cl.
*H04L 9/40* (2022.01)
*H04L 67/306* (2022.01)

(52) U.S. Cl.
CPC ........ *H04L 63/0853* (2013.01); *H04L 67/306* (2013.01)

(58) Field of Classification Search
CPC ... G06F 21/34; H04L 63/0853; H04L 9/3234; H04L 67/306
See application file for complete search history.

(56) References Cited

U.S. PATENT DOCUMENTS

| | | | |
|---|---|---|---|
| 2002/0138738 A1* | 9/2002 | Sames | H04L 63/14 713/185 |
| 2011/0237296 A1* | 9/2011 | Coppinger | H04L 63/0853 455/558 |
| 2017/0310660 A1* | 10/2017 | Newton | H04L 63/0281 |
| 2019/0018697 A1* | 1/2019 | Larsson | G06F 9/45558 |
| 2019/0191298 A1* | 6/2019 | Kim | H04W 4/50 |

\* cited by examiner

*Primary Examiner* — Kostas J Katsikis
(74) *Attorney, Agent, or Firm* — Holland & Hart LLP

(57) ABSTRACT

Methods, systems, and devices for mapping a smart card to multiple user personas are described. A smart card may be used for authenticating a user requesting access to a resource associated with an organization. The smart card may have embedded therein a digital certificate identifying a digital identity of the user. The user may be associated with multiple user accounts or personas in a repository, such as a user directory. Techniques may allow for the multiple user personas to be mapped to digital certificate of a single smart card and for authentication of the multiple user personas using the single smart card.

20 Claims, 9 Drawing Sheets

| Certificate Attribute | Tag | Example Value |
|---|---|---|
| Subject | X509:<S> | X509:<S>C=US, O=U.S.Government, OU=GovernmentAgency, CN=JANE DOEOID.0.9.2342.19200300.100.1.1=250010003151020 |
| Issuer | X509:<I> | X509:<I>C=US, O=U.S.Government, OU=CertificationAuthorities, OU=GovernmentDemonstrationCA |
| Public Key | X509:<SHA1-PUKEY> | X509:<SHA1-PUKEY>50bf88e67522ab8ce093ce51830ab0bcf8ba7824 |
| Subject Key Identifier | X509:<SKI> | X509:<SKI>df2f4b04462a5aba81fec3a42e3b94beb8f2e087 |
| Validity Period | X509:<VP. | X509:<VP>NB=Jul 21 2023 12:00:00 GMT, NA=Sep 22 2023 12:00:00 GMT |
| Serial Number | X509:<SR> | X509:<SR>46a65d49 |

| User | X509 Subject | X509 Subject Key Identifier |
|---|---|---|
| jane.doe@domain1.com | C=US, O=U.S.Government, OU=GovernmentAgency, CN=JANE DOE OID.0.9.2342.19200300.100.1.1=25001003151020 | df2f4b04462a5aba81fec3a42e3b94beb8f2e087 |
| jane.doe@domain2.com | C=US, O=U.S.Government, OU=GovernmentAgency, CN=JANE DOE OID.0.9.2342.19200300.100.1.1=25001003151020 | df2f4b04462a5aba81fec3a42e3b94beb8f2e087 |

FIG. 2D

TECHNIQUES FOR MAPPING A SMART CARD TO MULTIPLE USER PERSONAS

FIELD OF TECHNOLOGY

The present disclosure relates generally to identity and access management systems, and more specifically to techniques for mapping a smart card (e.g., a personal identity verification (PIV) card) to multiple user personas.

BACKGROUND

Identity and access management systems may be used by organizations to manage user identities and to control user access to data and resources, such as applications, services, physical spaces (e.g., a building, office, parking garage, or the like), etc., associated with the organization's various systems. Such identity and access management systems facilitate the assignment of a digital identity and a set of access privileges to users of the organization's systems. The identity and access management system may facilitate authenticating users and providing authorization for users to access the resources of the organization to which they were granted privileges.

Some organizations may manage access to system resources through the use of a physical electronic authentication device, such as a smart card, which may also be referred to as a personal identity verification (PIV) card. In such cases, the identity and access management system may facilitate authenticating users (e.g., and providing authorization for users) to access the resources of the organization via the smart card. However, some techniques for providing access to resources via smart cards may be deficient or sub-optimal in some current configurations.

SUMMARY

The described techniques relate to improved methods, systems, and devices that support mapping a smart card to multiple user personas. For example, a smart card may be used for authenticating a user requesting access to a resource associated with an organization. The smart card may have embedded therein a digital certificate identifying a digital identity of the user. In some cases, the user may be associated with multiple user accounts or personas in a repository, such as a user directory. The described techniques may allow for the multiple user personas to be mapped to a digital certificate of a single smart card and for authentication of the multiple user personas using the single smart card.

A method for user authentication by a device is described. The method may include receiving, from a client device, a first request for authentication of a first user using a PIV card, where the PIV card includes a certificate that includes at least a certificate attribute configured for authentication of the first user, and where the certificate attribute is associated with a user attribute usable by an identity management platform for authentication of the first user, identifying a set of user personas associated with the first user based on comparing a value of the certificate attribute to a respective value of the user attribute for one or more user personas of a set of multiple user personas associated with a user directory of the identity management platform, transmitting, to the client device, a first indication of the set of user personas, receiving, from the client device in response to the first indication, a second indication of a selection of a first user persona from among the set of user personas, and transmitting, to the client device in response to the second indication, a third indication acknowledging the selection of the first user persona.

A device for user authentication is described. The device may include one or more memories storing processor executable code, and one or more processors coupled with the one or more memories. The one or more processors may be individually or collectively operable to execute the code to cause the device to receive, from a client device, a first request for authentication of a first user using a PIV card, where the PIV card includes a certificate that includes at least a certificate attribute configured for authentication of the first user, and where the certificate attribute is associated with a user attribute usable by an identity management platform for authentication of the first user, identify a set of user personas associated with the first user based on comparing a value of the certificate attribute to a respective value of the user attribute for one or more user personas of a set of multiple user personas associated with a user directory of the identity management platform, transmit, to the client device, a first indication of the set of user personas, receive, from the client device in response to the first indication, a second indication of a selection of a first user persona from among the set of user personas, and transmit, to the client device in response to the second indication, a third indication acknowledging the selection of the first user persona.

Another device for user authentication is described. The device may include means for receiving, from a client device, a first request for authentication of a first user using a PIV card, where the PIV card includes a certificate that includes at least a certificate attribute configured for authentication of the first user, and where the certificate attribute is associated with a user attribute usable by an identity management platform for authentication of the first user, means for identifying a set of user personas associated with the first user based on comparing a value of the certificate attribute to a respective value of the user attribute for one or more user personas of a set of multiple user personas associated with a user directory of the identity management platform, means for transmitting, to the client device, a first indication of the set of user personas, means for receiving, from the client device in response to the first indication, a second indication of a selection of a first user persona from among the set of user personas, and means for transmitting, to the client device in response to the second indication, a third indication acknowledging the selection of the first user persona.

A non-transitory computer-readable medium storing code for user authentication is described. The code may include instructions executable by a processor to receive, from a client device, a first request for authentication of a first user using a PIV card, where the PIV card includes a certificate that includes at least a certificate attribute configured for authentication of the first user, and where the certificate attribute is associated with a user attribute usable by an identity management platform for authentication of the first user, identify a set of user personas associated with the first user based on comparing a value of the certificate attribute to a respective value of the user attribute for one or more user personas of a set of multiple user personas associated with a user directory of the identity management platform, transmit, to the client device, a first indication of the set of user personas, receive, from the client device in response to the first indication, a second indication of a selection of a first user persona from among the set of user personas, and transmit, to the client device in response to the second indication, a third indication acknowledging the selection of the first user persona.

In some examples of the method, devices, and non-transitory computer-readable medium described herein, the set of user personas includes the first user persona and a second user persona and the first user persona may be associated with a first user account and the second user persona may be associated with a second user account.

In some examples of the method, devices, and non-transitory computer-readable medium described herein, the first user account may be associated with a first domain of a first organization and the second user account may be associated with a second domain of a second organization.

In some examples of the method, devices, and non-transitory computer-readable medium described herein, at least one persona of the set of user personas may be associated with temporary access to one or more resources of an organization, one or more services of the organization, or both.

In some examples of the method, devices, and non-transitory computer-readable medium described herein, identifying the set of user personas may include operations, features, means, or instructions for identifying a first set of user personas associated with the first user based on comparing the value of the certificate attribute to the respective value of the user attribute for the one or more user personas and excluding at least one user persona from the first set of user personas to obtain a second set of user personas, where the at least one user persona may be excluded based on an expiration of an access timer associated with the at least one user persona, the second set of user personas including the set of user personas.

In some examples of the method, devices, and non-transitory computer-readable medium described herein, the certificate attribute includes a subject, an issuer and subject, an issuer and serial number, a subject key identifier, or a hash of a public key.

In some examples of the method, devices, and non-transitory computer-readable medium described herein, the certificate includes a set of multiple certificate attributes including the certificate attribute.

BRIEF DESCRIPTION OF THE DRAWINGS

FIG. 2A shows an example of a configuration of a digital certificate of a smart card that supports techniques for mapping the smart card to multiple user personas in accordance with aspects of the present disclosure.

FIGS. 2B and 2C show examples of user interfaces for generating configuration information that supports techniques for mapping a smart card to multiple user personas in accordance with aspects of the present disclosure.

FIG. 2D shows an example of a configuration of a repository that supports techniques for mapping a smart card to multiple user personas in accordance with aspects of the present disclosure.

DETAILED DESCRIPTION

Figure 1:
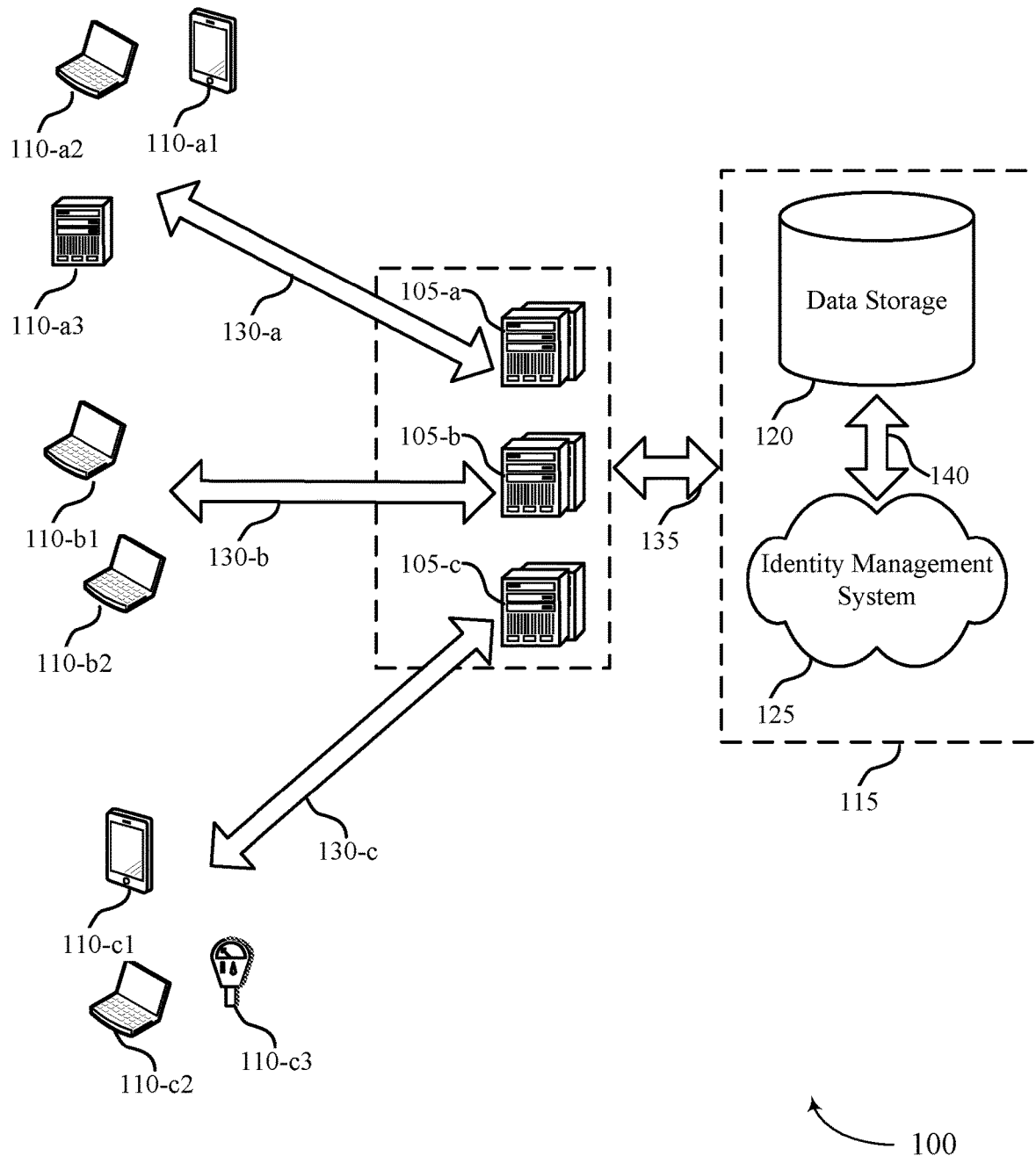
FIG. 1 illustrates an example of an identity and access management system that supports techniques for mapping a smart card to multiple user personas in accordance with aspects of the present disclosure.

Cloud computing provides for the delivery of computing services or resources over the Internet. These services and resources may include software applications, data storage, databases, servers, virtual machines, operating systems, analytics, computing environments or platforms, authentication services, etc. Some organizations may use cloud computing to increase performance, manage computing and operating costs, provide for on-demand scalability of computing resources, improve reliability, and many other reasons. However, the use of cloud computing may present some security vulnerabilities. As such, in order to ensure the security of an organization's cloud resources, the organization may use one or more tools to control access to the organization's resources (e.g., control what resources particular users are permitted to access, and what the users can do with the resources that they are permitted to access).

For example, when a user of an organization (e.g., an employee of the organization) wishes to access the organization's resources, the user may be requested to log into an account associated with the organization. The user may provide user credentials, such as a combination of a username and a password. In some cases, the user credentials may be stored in a digital certificate of a smart card (e.g., which may be accessed to log the user into the account). The system may use the user credentials as authentication information to verify an identity of the user. Once authenticated, the system may determine whether the user has been granted permission or privileges to access the requested resources.

In some cases, to alleviate a burden on an organization, the organization may employ a service provider, such as an identity provider (IdP), to provide identity and access management services on behalf of the organization. In such cases, the IdP may provide the identity and access management service to the organization as well as to other organizations. The multiple organizations may be clients of the IdP and the IdP may maintain an identity and access management system, also referred to herein as an identity management platform, to manage the identities and access privileges of the users of the different client organizations on behalf of those client organizations.

The identity management platform may maintain a user directory of users associated with the various client organizations. Each user, in turn, may be associated, in the user directory, with a user account or profile. Each user account or profile may be associated with user credentials and a corresponding set of privileges for accessing resources associated with the client organization. In some cases, a user may be associated, in the user directory, with multiple user accounts or profiles. In such cases, the different user accounts or profiles may correspond to different user personas associated with the user, e.g., different roles/accounts that may be associated with the user within the client organization (or in some cases, across different organizations). For instance, a particular user, such as an employee of a client organization who serves in the role of a system administrator, may be associated with multiple user personas in the user directory. For example, the user may be associated with a basic user persona and also an administrator user persona. Each of the different user personas may be associated with different levels of access privileges. For instance, the administrator user persona may have greater access to resources of the organization than the basic user persona.

In some cases, the client organization may manage access to their system's resources through the use of a smart card or a personal identity verification (PIV) card. In such cases, users of the client organization's systems may be provided with a smart card to be used by the user to access the organization's resources. The smart card may be embedded with a microprocessor (e.g., a smart chip) and memory, which may store information to be used to authenticate the user, such as a digital certificate. The certificate may be associated with a number of predefined attributes that may be used for authentication. For example, one or more of the certificate attributes may be used to provide information corresponding to user credentials, such as a username, associated with the user associated with the smart card. The user may provide the card to a smart card reader (e.g., coupled to the identity management platform), when the user wishes to access a resource of the client organization. When the smart card is read, the identity management platform may access the certificate embedded therein to identify the corresponding user credentials. The user credentials accessed from the certificate may be compared with user credentials stored in the user directory maintained by the identity management platform in order to authenticate the user, to identify an account associated with the user, and to determine access privileges associated with the user's account.

In some cases, however, an attribute (e.g., each of the attributes) of a smart card's certificate may be (e.g., may only be) associated with one unique value (i.e., the certificate may only be capable of including a single digital identity). As such, use of a single card to support a user having multiple user accounts or personas may lead to one or more technical difficulties. In some examples, the identity management platform may support such users (e.g., a user with multiple user accounts) by combining multiple values (corresponding to multiple unique personas) in a single field (e.g., a multi-value field) of a user directory of the identity management platform. In such examples, however, each value of the multi-value field may map to different digital certificates associated with a user, which may necessitate that the identity management platform maintain several different mappings (e.g., a respective mapping to the respective certificate). Maintaining different mappings for multiple user personas in this manner may lead to a cluttered schema (e.g., for the identity management platform) that may be difficult to manage and maintain. Such multi-value fields may not contain data that is unique across multiple users of the identity management platform. In such examples, the identity management platform may be unable, when a user provides the smart card, to provide a unique resolution to a user account for authentication and may instead potentially identify user accounts associated with different users (e.g., a value in the field of the user's smart card may be associated with a user account of a different user). As a result, the identity management platform may necessitate that the user provide a respective username for the user account that they wish to access via the smart card prior to use of the smart card. In other words, some (e.g., conventional) identity management platforms may request that users provide a username before an attribute of the smart card's certificate may be associated with (e.g., matched to) a user, thus necessitating that the user remember their particular username. Necessitating that a user maintain and remember multiple usernames for multiple user accounts may impose a considerable burden on the user and lead to security vulnerabilities for the identity management platform.

Various aspects of the present disclosure generally relate to techniques for mapping a smart card to multiple user personas associated with a single user. For example, in accordance with such techniques, an identity management platform may receive a request for authentication from a user (e.g., an employee of an organization) using a smart card (e.g., a PIV card) embedded with a digital certificate. The authentication request may be in response to the user requesting access to a resource associated with the organization. The digital certificate may include one or more certificate attributes that are configured for use in authenticating the user. A certificate attribute may be associated with a corresponding user attribute maintained in a user directory by the identity management platform. In the case where the user may be associated with multiple user personas, the user directory may maintain a corresponding user profile for each of the multiple user personas. For each of the multiple user profiles (corresponding to the multiple user personas), a user attribute that corresponds to a certificate attribute of the smart card may include a same value as a value of the corresponding certificate attribute. That is, a value of a user attribute may correspond to a value of a certificate attribute of the digital certificate embedded in the user's smart card, and the value of the user attribute may be the same across multiple user personas (e.g., user profiles) of the user. In some examples, using a same value of the user attribute across multiple user personas of a single user may enable the mapping of the single smart card to multiple user personas associated with the user. Accordingly, during authentication of the user, the identity management platform may identify, in the user directory, a set of user personas associated with the user by comparing values of one or more of the certificate attributes to respective values of one or more corresponding user attributes. The identity management platform may transmit to the user, such as via the user's device, an indication of the identified user personas.

For example, the identity management platform may transmit, to the user's device, a list of the usernames associated with the user accounts corresponding to the identified user personas. The list of usernames may be output in a user interface at the user's device, such as at a browser, or an application, or the like. The user may select a first username from the list of usernames output at the user device. For example, the user may select the username that the user wishes to use to access the requested resource. In response to the user selection, the identity management platform may receive an indication of the selected first username, i.e., the selected user persona. In some cases, the identity management platform may transmit, to the user's device, an acknowledgement of the selection of the user persona. The acknowledgment may, in some cases, include an authentication token, which the user device may use to obtain access to the requested resource.

The disclosed techniques and framework for mapping a smart card to multiple user personas associated with a single user may lead to reduced complexities associated with maintenance and management of the user directory, for example, due to a flat storage associated with mapping multiple user personas to a single value of a user attribute. Further, as a result of such mappings, various security vulnerabilities associated with conventional frameworks may be mitigated. The disclosed techniques and framework also provides for an improved user experience, for example, by not necessitating that the user remember and provide the identity management platform with the user account that the user wishes to access. Instead, the disclosed techniques provide a mechanism for uniquely resolving user personas associated with a particular user and prompting the user to select an appropriate user persona associated with the user.

Aspects of the disclosure are initially described in the context of a system or platform for distributed computing. Aspects of the disclosure are also illustrated by and described with reference a configuration diagram of a digital certificate of a smart card, user interfaces, a configuration of a repository, and a process flow. Aspects of the disclosure are further illustrated by and described with reference to apparatus diagrams, system diagrams, and flowcharts that relate to techniques for mapping a smart card to multiple user personas.

FIG. 1 illustrates an example of a system 100 for distributed computing (e.g., cloud computing) that supports techniques for mapping a smart card to multiple user personas in accordance with various aspects of the present disclosure. The system 100 may include an identity management platform 115, one or more cloud client systems 105, and one or more user devices 110.

The system 100 may be an example of a multi-tenant system. For example, the system 100 may store data and provide software applications, services, infrastructure, data storage, security, database management, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy.

The system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

In some examples, the system 100 may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

In some examples, the system 100 may support multi-tenancy for identity management and/or authentication services. For instance, the system 100 may provide cloud-based identity management and authentication services for multiple tenants or client systems using the identity management platform 115.

The identity management platform 115 may be a platform or infrastructure that supports identity management and authentication services. The identity management platform 115 may include data storage 120 and an identity management system 125. In some cases, data processing may occur at any of the components of identity management platform 115, or at a combination of these components. In some cases, the identity management system 125 may be one or more servers that may perform the data processing associated with the identity management platform. The data storage 120 may include multiple servers or storage devices. The multiple servers or storage devices may be used for data storage, management, and/or processing associated with the system 100. For instance, the data storage 120 may store a user directory and authentication configuration information used to manage authentication and access control for the various users associated with the cloud client systems 105. The data storage 120 may receive data from the identity management system 125 via a connection 140, or from the cloud client systems 105 or the user devices 110. The data storage 120 may utilize multiple redundancies for security purposes. In some cases, the data stored at the data storage 120 may be backed up by copies of the data at a different data center (not pictured). The identity management platform 115 may include one or more other components (not shown in FIG. 1), such as an AI client, a compiler, and a reporting client, among other components. The AI client may support communication with an AI system, such as a generative AI system or one or more other types of systems that support foundational machine learning models. Additionally, or alternatively, the reporting client may support communications with a database (e.g., the data storage 120).

The identity management platform 115 may be an example of a public or private cloud-based system. The identity management platform 115 may provide various identity management and authentication services to tenants or clients of the system 100 who may contract with the identity management platform 115 to provide such services to users of the tenants on behalf of the tenants. For instance, the identity management platform 115 may provide identity management and authentication services to the cloud client systems 105, which may be associated with an entity, such as an enterprise, organization, individual, or the like, so that users (e.g., employees, contractors, customers, guests) of the cloud client systems 105 may be able to securely access system resources (e.g., data, a software application, a website, storage, a service) or other resources (e.g., physical spaces) associated with the cloud client systems 105. The identity management platform 115 may provide to the cloud client systems 105 services such as identity lifecycle management and governance services, authentication services (e.g., multi-factor authentication, single sign-on (SSO)), security services (e.g., services for identifying malicious attacks), or other identity management and authentication services.

In some cases, the identity management platform 115 may interface with external authentication systems, such as third party identity providers (IdPs) so that users of the cloud client systems 105 may be able to authenticate through a third-party IdP that the user may already use or that an administrator of a cloud client system 105 request for its users to use. As such, the identity management platform 115 may facilitate the use of such third-party IdPs by the cloud client systems 105 through third-party IdP profiles or authentication integrations generated and managed by the identity management platform 115. Such IdP profiles or authentication integrations may allow the identity management platform 115 to provide authentication via the third-party IdP for requests for resources received from users associated with a cloud client systems 105.

The cloud client system 105 (e.g., cloud client system 105-*a*, cloud client system 105-*b*, cloud client system 105-*c*) may be an example of devices, such as computers, servers, virtual machines, etc. associated with tenants or clients of the identity management platform 115. The cloud client systems 105 may be associated with various entities, such as an enterprise, organization, individual, or the like that receive identity management and authentication services from the identity management platform 115. The cloud client systems 105 and the identity management platform 115 may communicate over a network 135. The network 135 may implement transfer control protocol and internet protocol (TCP/IP), such as the Internet, or may implement other network protocols. The cloud client systems 105 may maintain or store system resources, such as data, software applications, services, websites, storage, etc. In some cases, respective users (e.g., employees, contractors, customers, vendors, guests) of the various cloud client systems 105 may use or wish to access the system resources associated with the cloud client systems 105. The users may request access to system resources of the cloud client systems 105 via the user devices 110.

The user devices 110 may be associated with users of the various cloud client systems 105. For example, user devices 110-*a*1, 110-*a*2, and 110-*a*3 may be devices associated with users of the cloud client system 105-*a*; user devices 110-*b*1 and 110-*b*2 may be devices associated with users of the cloud client system 105-*b*; and user devices 110-*c*1, 110-*c*2, and 110-*c*3 may be devices associated with users of the cloud client system 105-*c*. The users may be individuals (e.g., end-users), applications, computers or other devices, etc. The user devices 110 may be servers, desktop computers, laptop computers, tablets, mobile devices, sensor devices, infrastructure devices, smart card reading devices, or any other computing devices or systems capable of generating, analyzing, transmitting, or receiving communications. The cloud client systems 105 may communicate with the user devices 110 via one or more networks 130 (e.g., a network 130-*a*, a network 130-*b*, a network 130-*c*). The networks 130 may include wired or wireless networks, such as a wide area network (WAN), a local area network (LAN), a personal area network (PAN), a metropolitan area network (MAN), a virtual private network (VPN), the Internet, or any other type of network. The user devices 110 may communicate with the cloud client systems 105 to request and receive access to one or more system resources associated with the cloud client systems 105. In some cases, the various users associated with the user devices 110 may have an associated security or permission level, or a set of privileges defining what systems resources the user may access and what type or level of access the user has for such resources. For instance, a user may be assigned an account, such as a user account, on a cloud client system 105 with which the user is associated, and the cloud client system 105 may have granted a set of privileges to the user account for access to one or more applications, data, services, database information, physical spaces, etc. maintained by the cloud client system 105 and may not have been granted access to other system resources. The management of such access control of the various users of the cloud client systems 105, may be performed by the identity management platform 115, on behalf of the cloud client systems 105. For example, the identity management platform 115 may manage log-in requests from users, verify authenticators used for log-in requests, determine privileges associated with the users, and provide authorization to access to requested system resources.

In some examples, a user of a first organization may request access to a system resource, such as an application maintained by the first organization. To request access to the resource, in some cases, the user may use a smart card issued by the first organization as a means to provide, for authentication purposes, the user's identity and user credentials to the cloud client system 105-*a* associated with the first organization. The smart card may have embedded therein a digital certificate that may store information associated with the user's digital identity, e.g., user credentials. The information may be stored in one or more attributes of the certificate. The smart card may be read by a smart card reader, which may, for example, be embodied as the user device 110-*a*1. The user device 110-*a*1 may be connected, via the network 130-*a*, to the cloud client system 105-*a*. Reading the smart card may cause a user interface associated with a sign-in window to be output to the user device 110-*a*1 or to another display device connected to the user device 110-*a*1. In some cases, the user interface may be a sign-in window associated with the cloud client system 105-*a*, in other cases, the user interface may be a sign-in window associated with a third-party IdP (e.g., that the user may wish to use for purposes of authentication). Reading the smart card may cause information to be extracted from the one or more attributes of the certificate of the smart card, which may be used to authenticate and authorize the user for access to the first organization's resources. The extracted information may be provided to the cloud client system 105-*a* and, in response, the cloud client system 105-*a* may send extracted attributes of the certificate to the identity management platform 115 for the identity management platform 115 to authenticate the user and authorize the user's access request. The identity management platform 115 may receive the attribute information extracted from the one or more attributes of the certificate and may verify the certificate. After verifying the certificate, the identity management platform 115 may compare the extracted attribute information to information stored in a user directory of the identity management platform 115, such as in the data storage 120. The user directory may be a central repository for managing information associated with users of one or more of the cloud client systems 105 that the identity management platform 115 provides identity management and authentication services to. The user directory may include user profile information, such as names, usernames, passwords, roles, permissions and privileges, etc., about users who have accounts on the cloud client systems 105. In accordance with aspects of this disclosure, the user directory may be structured to include one or more fields or attributes that correspond to those on the certificate of the smart card in order to facilitate identification and authentication of the user. Accordingly, based on comparing the attribute information extracted from the certificate of the smart card to the data stored in corresponding fields in the user directory, the identity management platform 115 may identify a user profile that matches the attribute information extracted from the certificate. As a result, the user may be authorized for access to the requested application.

In some cases, an administrator of the cloud client system 105-*a* may want to define a second account or profile to be associated with the user. For example, the user may be employed in the first organization's information technology (IT) department as a software engineer and, in some cases, the user may also act in the capacity of a system administrator for the first organization. Accordingly, the user may have a first account (e.g., a basic user account) that the user may use for access to the cloud client system 105-*a* when the user is acting in the capacity as a software engineer and may have a second account (e.g., an administrator account) that the user may use for administrator access to some system resources associated with the cloud client system 105-*a*, when the user is acting in the capacity as a system administrator. The user's two different accounts, the basic user account and the administrator account, may be associated with two different sets of privileges or levels of permission. Having multiple smart cards to support the user's multiple user personas may present security concerns, such as lost or theft of one of the smart cards, which may go unnoticed for a period of time since in many cases one (e.g., only one) of the multiple may be used on a regular basis. Further, it may be an inconvenience for the user to carry multiple smart cards and to remember which smart card is associated with which user account. Accordingly, it may be desirable for the user to have a single smart card that may be mapped to both of the user accounts or personas. However, because the smart card may be (e.g., may only be) capable of storing a single digital identity or a single set of user credentials on the certificate embedded therein, using a single smart card to authenticate a user having multiple user personas may present technical challenges.

In accordance with one or more aspects of this disclosure, the identity management platform 115 may support the mapping of a single smart card to multiple user roles or personas. For instance, the user directory may store or maintain a one-to-one mapping of user profiles to user personas. That is, the user directory may maintain a separate user profile corresponding to each of a user's different user personas. In turn, each of the multiple user profiles may comprise attribute values that match the corresponding attribute values of the certificate of the smart card. Accordingly, when the identity management platform 115 attempts to authenticate a user having multiple user personas associated with the certificate of the smart card, by comparing the user credentials extracted from the certificate to corresponding information in the user directory, the multiple user profiles associated with the multiple personas may be identified. The identity management platform 115, in such cases, may cause the multiple user personas to be output to a user interface of the user device 110-*a*1 (or other connected display device) and the user may select one of the user personas to use for access to the requested application. In this way, the disclosed techniques may provide for simplified management of a user directory due to the flat storage of mappings of a certificate to multiple user personas. In accordance with the disclosed techniques and framework users may refrain from remembering and providing the identity management platform 115 with the user account that the user wishes to access, which may lead to an improved user experience, and reduced security vulnerabilities.

It should be appreciated by a person skilled in the art that one or more aspects of the disclosure may be implemented in a system 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

FIG. 2A shows an example of a configuration 200 of a digital certificate of a smart card that supports techniques for mapping the smart card to multiple user personas in accordance with aspects of the present disclosure. Some organizations may manage access to their system's resources through the use of a PIV card or one or more other types of smart cards. In such cases, users (such as individuals, devices, applications, or the like) of an organization's systems, such as cloud client systems, may be provided with a smart card to be used by the user to access resources associated with the organization. The smart card may be a physical device, such as a card that is about the size of a credit card, which may be embedded with a microprocessor (e.g., a smart chip) and memory, which may store information to be used to authenticate a user to whom the card is issued. For instance, the smart card may have embedded therein a digital certificate, such as an X.509 certificate.

Digital certificates, such as X.509 certificates, provide many security-related benefits. These certificates maintain the digital identities of specific users or devices to whom they are issued and, thus, provide a relatively secure and relatively accurate means for an organization to verify who is accessing the organization's resources. Each certificate is associated with a pair of encryption keys, such as a public key and a private key. The certificate may include the public key, along with other information, such as the certificate owner's name or other identification information, identification information of an issuer of the certificate, a validity period associated with the certificate, a digital signature from the issuer, and the like. The public key may be used for encryption and digital signature verification and may be shared freely, while the private key, which may be stored in a secure location separate from the certificate and may be accessible to (e.g., only to) the owner, may be used for decryption and digital signature generation. The public key may be used to encrypt information in a manner that may be capable of decryption using the private key. Because the holder of the private key (e.g., only the holder of the private key) can decrypt information encrypted by the public key, the certificate may be a relatively strong and secure means for authenticating a user's identity. Further, such certificates may be used as passwords during the authentication process-granting secure access to an organization's resources without the security risks associated with passwords. The certificate may be issued by a Certificate Authority (CA), which may be a trusted source that may be responsible for verifying an identity of users or entities requesting such certificates. In some cases, the identity management platform may act as a CA.

The X.509 certificate may be based on an X.509 standard, which defines the certificate format and structure 210. Accordingly, each certificate may be configured or structured with one or more fields (e.g., predefined fields) or attributes that correspond to information, such as information associated with a user (e.g., owner) of the certificate, an issuer of the certificate, and/or various other the cryptographic parameters associated with the certificate itself. As illustrated in the example of FIG. 2, an attribute may have an associated tag. For example, a subject key identifier attribute of a X.509 certificate may be associated with a tag having an expression of X509:<SKI>. In such an example, a sequence with the expression X509:<SKI> may correspond to a value of the subject key identifier attribute. In other words, a value for a certificate attribute corresponding to the subject key identifier attribute may conform to an expression of "X509:<SKI>+subkectKey IdentifierValue". In the example of FIG. 2A, the subject key identifier attribute may a value of X509:<SKI>df2f4b04462a5aba81fec3a42e3b94beb8f2e087, in which the sequence "df2f4b04462a5aba81fec3a42e3b94beb8f2e087" may correspond to a subkectKeyIdentifierValue. In some examples, a value of an attribute (e.g., a the subkectKey IdentifierValue) may be a randomly generated sequence or a hash of a key (e.g., a public key) associated with the certificate. Some example attributes that may be included in a certificate are shown below in Table 1.

TABLE 1

| Attribute Name | Attribute Description |
|---|---|
| Subject | Identifies the name or other identification information of the owner of the certificate. |
| Issuer | Identifies the entity that issued the certificate, such as the CA. |
| Public Key | Identifies the subject's public key, used for encryption and verifying digital signatures. |
| Subject Key Identifier | A unique identifier of the public key, such as a hash of the public key. |
| Validity Period | A timeframe during which the certificate is valid |
| Serial Number | A unique identifier assigned to the certificate |
| Digital Signature | A signature created by the CA to verify the authenticity of the certificate's content. |

In some cases, the certificate may include additional or different fields or attributes from those provided and discussed herein.

Figures 2B, 2C:
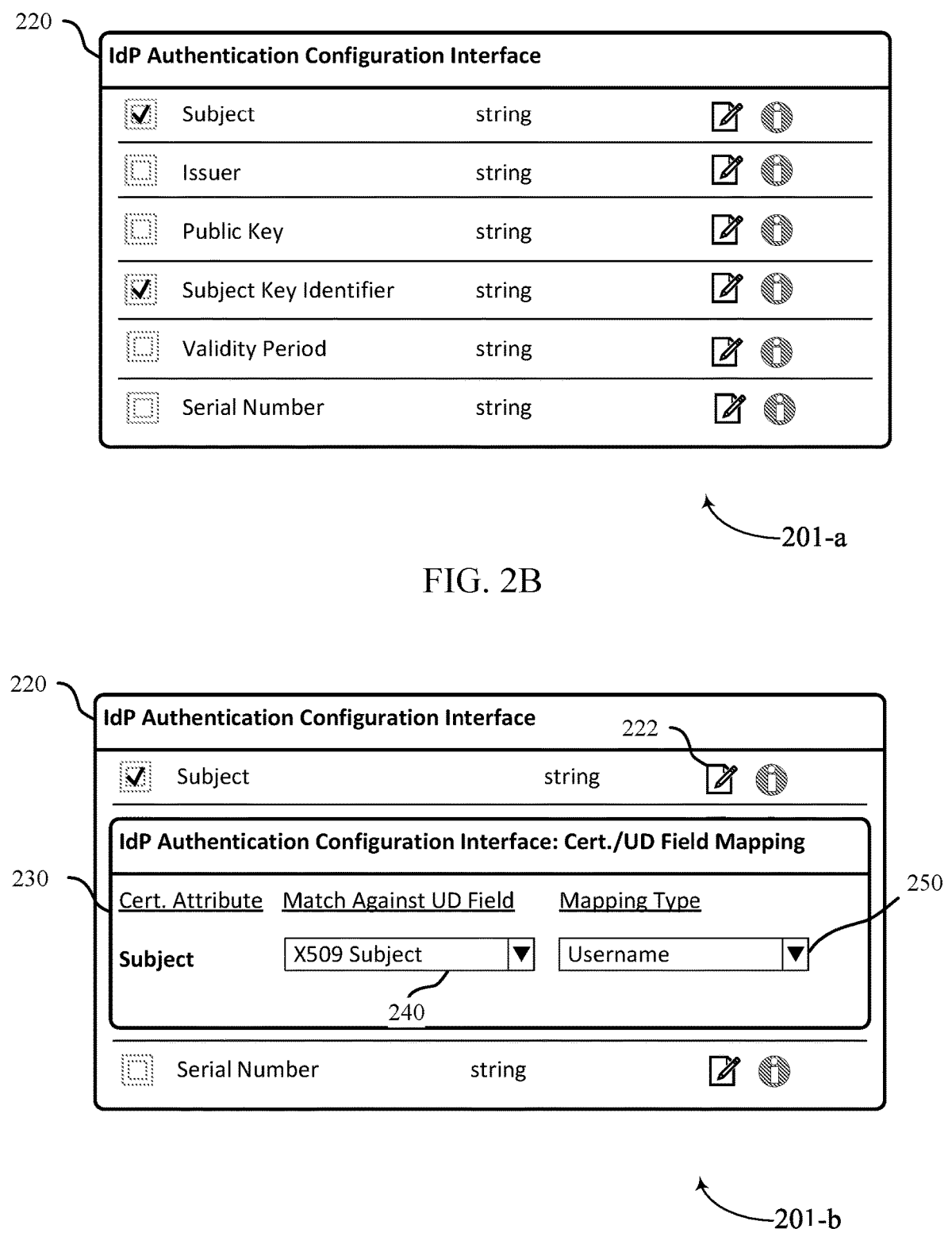

FIGS. 2B and 2C show examples of user interfaces 201-*a* and 201-*b* for generating configuration information that supports techniques for mapping a smart card to multiple user personas in accordance with aspects of the present disclosure. In some cases, an administrator of an identity management platform, such as an identity management platform 115 illustrated by and described with reference to FIG. 1, may determine particular attributes from the certificate to be used for authentication purposes. In some cases, a single certificate attribute, such as a subject key identifier attribute, may be used for authentication. In other cases, multiple certificate attributes, such as an issuer attribute and a serial number attribute, or an issuer attribute and a subject attribute, may be used for authentication. One or more certificate attributes (e.g., which certificate attribute, or which combination of certificate attributes) to be used for authentication may depend on the organization or the IdP being used to perform the authentication. That is, the one or more certificate attributes used for authentication may be configured by a user (e.g., by an administrator) of the organization or the IdP, and the configuration may be a same configuration or a different configuration across users of the organization (e.g., across multiple smart cards), across different organizations, or across different IdPs. For instance, a first IdP may use the subject key identifier attribute for authenticating users, while a second IdP may use a combination of certificate attributes, such as an issue attribute and a serial number attribute for authenticating users. Such indications may be maintained in configuration information associated with the IdP (or the organization), which may be used when authentication is performed by the corresponding IdP. That is, in some examples, the configuration information may be associated with (e.g., specific to) the particular IdP (or organization) used during the authentication process. Accordingly, the identity management platform may maintain respective (e.g., separate) configuration information for each IdP that may be used for performing authentication. In some cases, the configuration information may be stored in data storage, which may be an example of data storage illustrated by and described with reference to FIG. 1. In some examples, an administrator may use the configuration to elevate or remove privileges (e.g., to elevate a user to specify a mapping used to switch to other user accounts with a different mapping and, in some case, different privileges).

In some cases, the identity management platform may provide one or more configuration interfaces, such as a configuration interface 220, to be used to configure aspects that support mapping a certificate to multiple user personas. For example, the configuration interface 220 may be used by an administrator (e.g., associated with the organization or the IdP) to configure the identity management platform to perform authentication using particular certificate attributes. For instance, the administration may indicate, via the configuration interface 220, one or more certificate attributes to be used for authentication by the identity management platform (such as examples in which the identity management platform may be a default IdP used by one or more of the cloud client systems, which may be examples of cloud client systems illustrated by and described with reference to FIG. 1). The configuration interface 220) may cause configuration information to be generated for use during the authentication process.

The configuration interface 220 may be used by administrators of the identity management platform to configure configuration information associated with one or more other IdPs (e.g., third-party IdPs). For instance, the configuration interface 220 may be used to further configure configuration information of third-party IdP authentication integrations to include information identifying one or more certificate attributes to be used when performing authentication using the third-party IdP authentication integration. For example, the identity management platform may be an IdP (e.g., a default IdP) used for performing authentication, and the identity management platform may interface with one or more third-party IdPs to enable authentication of users through the one or more third-party IdPs (e.g., one or more third-party IdPs that the user may have previously used or is otherwise configured to use). As such, the identity management platform may facilitate the use of such third-party IdPs (e.g., by one or more cloud client systems) through third-party IdP authentication integrations generated and managed by the identity management platform. Such IdP authentication integrations may allow the identity management platform to provide authentication of a user via third-party IdPs. The third-party IdP authentication integrations may be an example of a configuration of data or software processes or routines that enable authentication of users of a cloud client system by the identity management platform using the corresponding third-party IdP. For example, a third-party IdP authentication integration may include configuration information that identifies a set of features (e.g., a particular authentication algorithm) of a third-party IdP to use for authentication, which authentication response format of the third-party IdP to use, how the authentication response from the third-party IdP should be processed by the identity management platform, which may be an example of an identity management platform illustrated by and described with reference to FIG. 1. In some cases, administrators may use the configuration interface 220 to configure the configuration information associated with the third-party IdP authentication integrations to identify one or more attributes of a certificate that are to be used when authenticating users via the corresponding third-party IdP.

In some cases, the configuration interface 220 may provide the user with a list of recommended certificate attributes or certificate attribute combinations that may be used for authentication, and the administrator may select the certification attributes to be used for the particular IdP.

In some cases, the administrator of the identity management platform may further configure or structure a repository, such as a user directory, to support the mapping of a single smart card to multiple user personas. The user directory may be a directory of users associated with the one or more organizations. Each user in the user directory may be associated with a user account or profile. Each user account or profile may be associated with user credentials and a corresponding set of privileges for accessing resources associated with the organization. In some cases, a user may be associated, in the user directory, with multiple user accounts or profiles. In such cases, the different user accounts or profiles may correspond to multiple (e.g., different) user personas associated with the user. The different user personas may correspond, for example, to different roles that the user may have within the organization, to different departments or different groups that the user may belong to within the organization, to different systems that the user may request access to, etc. In some cases, the different user personas may correspond to user accounts across different unrelated organizations, such as across different domains.

In some cases, the user personas may be temporary user personas. For example, the user may be configured with a temporary user persona when the user needs to access systems in a different department of an organization for a limited period of time. Accordingly, the user personas may be configured to be used for a predetermined period of time, and access to resources associated with that user persona may be revoked at an expiration of the predetermined time. In some cases, an access timer may be used to track the predetermined time and the user or an administrator of the identity management platform may be notified at an expiration of the timer. The expiration of an individual user persona may be separate and independent of an expiration of a certificate, such that in some cases an individual user persona may expire and be revoked prior to a time of expiration of the validity of the certificate. The identity management platform may maintain the period of time associated with user persona in a corresponding user profile in the user directory.

The identity management platform may maintain a user directory containing information for all of the users of the organizations it serves, for example, for one or more (e.g., each) cloud client systems. In some cases, the identity management platform may maintain a separate user directory corresponding to one or more (e.g., each) of the different cloud client systems. In some cases, the identity management platform may maintain a single user directory for multiple (e.g., all) of cloud client systems. In some cases, the identity management platform may maintain one or multiple (e.g., different) user directories for one or more cloud client systems and a combined user directory for one or more other cloud client systems. In some cases, the identity management platform may maintain the user directory in the data storage.

The user directory may be configured or structured to include, among other fields, fields corresponding to attributes of a certificate of a smart card. For instance, the user directory may include user attribute fields that correspond to one or more attributes illustrated by and described with reference to FIG. 2A (e.g., a Subject, an Issuer, a Public Key, a Subject Key Identifier, a Validity Period, and a Serial Number). In some examples, a user attribute field (e.g., each field) may correspond to a respective certificate attribute. In some cases, the user directory may include different or additional fields. The identity management platform may maintain a mapping of the user directory fields to the certificate attribute fields in the configuration information. In some examples, the mapping may be associated with an SSO or multi-factor authentication process (e.g., may be an SSO or multi-factor authentication mapping), such that in a configuration (e.g., an IdP configuration), those user attribute fields may be determined for a selected (e.g., particular) SSO/MFA and elevated mapping. For example, the configuration information may further indicate for a particular IdP, which attributes of the certificate map to which fields in a user directory. The configuration information may further indicate the type of mapping or the purpose for which the mapped fields should be. For instance, the configuration information may indicate which certificate attribute is to be used as the username and may further indicate which field in the user directory is the corresponding username field and should be matched to the certificate attribute.

As described with respect to FIG. 2B, in some cases, the identity management platform may provide one or more configuration interfaces to be used to generate such configuration information. For instance, referring to FIG. 2C, the configuration interface 220) may enable administrators to configure which fields in the user directory match to which attributes of the certificate and a type of the mapping. For instance, at the configuration interface 220, the administrator may select an edit option 222, which may cause a configuration interface 230 to be output. The configuration interface 230 may provide a list 240 of user directory fields, and a list 250 of mapping types, and the administrator may select one of the user directory fields to map to the selected certificate attribute, and a corresponding mapping type identifying the type of mapping.

FIG. 2D shows an example of a configuration 202 of a repository that supports techniques for mapping a smart card to multiple user personas in accordance with aspects of the present disclosure. In some examples, to support the techniques described herein, an identity management platform, such as an identity management platform illustrated by and described with reference to FIG. 1, may be configured such that user directory fields that map to the certificate attributes used for authentication may be populated with values that correspond to the values in the corresponding certificate attributes. Further, when a user is associated with multiple user profiles in the user directory, each of the user profiles may be populated with data matching the values of the certificate attributes, such that each of the multiple user profiles for a given user share the same attribute values. For example, FIG. 2D illustrates a snippet 260 of the user directory where user directory fields X509 Subject (e.g., a subject attribute of a X509 certificate) and X509 Subject Key Identifier (e.g., a subject key identifier attribute of the X509 certificate) have been configured to be used for authenticating a user, such as described with respect to FIGS. 2A-2C, and where a user "Jane Doe" is associated with multiple user personas. As shown, each of the user profile records of the user directory may be populated, such as by an administrator, with values that match those on the user's smart card certificate, such as those shown in FIG. 2A. In accordance with these techniques, multiple user personas may be mapped to a certificate of a single smart card.

Accordingly, when the user is authenticated using the credentials stored in the certificate of the user's smart card, the identity management platform may use the configuration information to identify the certificate attributes to be used for authentication by an IdP performing the authentication. The identity management platform may further identify, using the configuration information, the fields in the user directory that map to the certificate attributes to be used for authentication by the IdP. The identity management platform may then search the identified user directory fields for one or more user profiles having user attribute values that match the corresponding certificate attribute values. In accordance with these techniques, multiple user personas that are mapped to a certificate of a single smart card may be efficiently identified.

Figure 3:
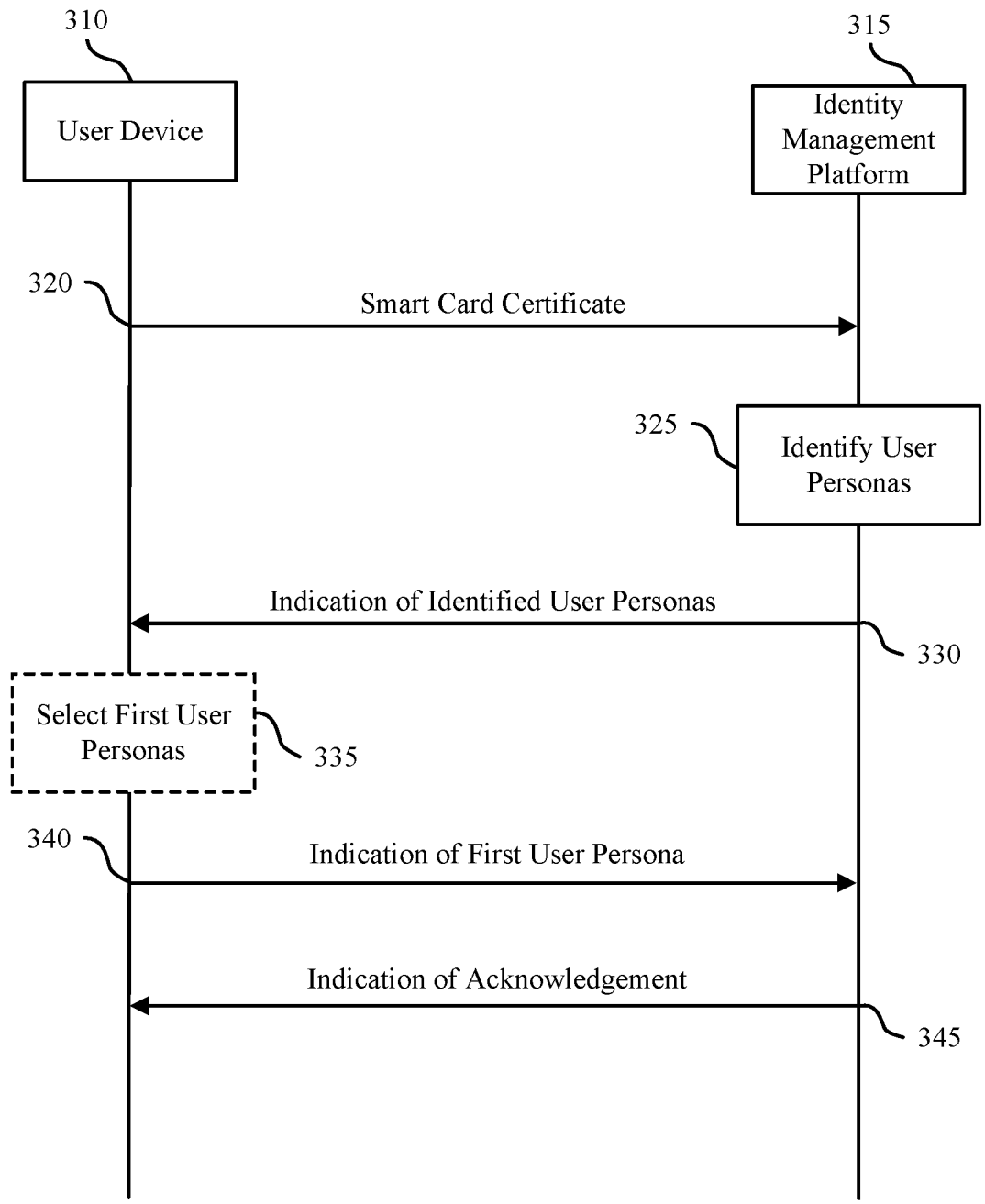
FIG. 3 shows an example of a process flow that supports techniques for mapping a smart card to multiple user personas in accordance with aspects of the present disclosure.

FIG. 3 shows an example of a process flow 300 that supports techniques for mapping a smart card to multiple user personas in accordance with aspects of the present disclosure. The process flow 300 may implement or be implemented by aspects of the system 100. For example, one or more aspects of the process flow 300 may be implemented by a user device 310 and an identity management platform 315, which may be examples of the user device 110 and the identity management platform 115, illustrated by and described with reference to FIG. 1. For example, the user device 310) may be used by a user, e.g., an end user of an organization associated with a cloud client system. The identity management platform 315 may be used to authenticate the user on behalf of the organization, when the user requests access to a resource associated with the cloud client system. In the following description of the process flow 300, the steps performed between the user device 310 and the identity management platform 315 may be performed in different orders or at different times than shown. Additionally, or alternatively, some operations may be omitted from the process flow 300 and other operations may be added to the process flow 300. In some examples, two or more operations may be combined in the process flow 300.

In some examples, the user may request access to a resource associated with the cloud client system via a smart card (e.g., a PIV card). In such examples, the user may perform one or more operations to initiate a connection to the organization's systems, such as the cloud client system illustrated by and described with reference to FIG. 1. For example, the user device 310 may perform one or more operations to initiate authentication via the smart card for access to the resource or one or more other resources. In some examples, the user may use the user device 310 to request access to the resource via a website associated with the cloud client system (e.g., a website running on a browser accessed via the user device 310). In such an example, the user may perform one more operations to authenticate (and enroll) an identity of the user with an IdP (e.g., access the resource or the organization's system via the smart card). In some examples, smart card properties (e.g., certificate attributes) may be persisted during one or more authentication processes (e.g., SSO), for example, with the creation of an identifier (e.g., associated with the IdP), which may hold one of more of the certificate attributes. Some smart card properties (e.g., certificate attributes) may also be persisted in an authenticator enrollment object (e.g., resulting from the authentication process, such as a token).

In some examples, the identity management platform 315 may serve as the IdP for authenticating the user. In some other examples, the identity management platform 315 may determine one or more third-party IdPs (e.g., third-party IdP authentication integrations) associated with the cloud client system. The third-party IdP authentication integrations may be a particular configuration of data or software processes or routines that enable authentication of users of the cloud client system by the identity management platform 315 using the corresponding third-party IdP. For example, a third-party IdP authentication integration may include configuration information that specifies a set of features of a third-party IdP to use for authentication (e.g., a particular authentication algorithm), which authentication response format of the third-party IdP to use, how the authentication response from the third-party IdP should be processed by the identity management platform 315. In some cases, the configuration information may further indicate one or more attributes of a certificate, such as a digital certificate of a smart card, to be used to authenticate users. The identity management platform 315 may maintain policy information indicating one or more third-party IdP authentication integrations associated with one or more corresponding cloud client systems. In some cases, the policy information may indicate a default third-party IdP to use for authentication. If one or more third-party IdP authentication integrations are determined to be associated with the user (e.g., the cloud client system associated with the user), the identity management platform 315 may send, to the user device 310, a list of available third-party IdPs having authentication integrations associated with the cloud client system. That is, the user device 310 may receive a list of available third-party IdPs having authentication integrations associated with the cloud client system. In response, the user device 310 may output, via a browser, application, other user interface, at the user device 310 (or display device connected to the user device 310) an indication of an IdP selected from the list of available third-party IdPs as for authentication. Alternatively, in some cases, the user device 310 may not display the list of available third-party IdPs and may automatically output a sign-in page associated with a third-party IdP (e.g., a third-party IdP indicated as a default third-party IdP). In some cases, such as cases in which the list of available third-party IdPs is output at the user device 310, the user may select one of the third-party IdPs from the list to use for authentication. In this case, the user device 310 may send information indicating the selected third-party IdP to the identity management platform 315. In some cases, such as in response to receiving an indication of a selected third-party IdP, the identity management platform 315 may send the user device 310 a message directing the user device 310 to output at a browser, application, or other user interface a sign-in user interface associated with the selected third-party IdP. Alternatively, if no third-party IdP was output at the user device 310 and/or selected by the user, the user device 310 may continue to output the sign-in user interface associated with the default IdP.

At step 320, the user device 310 may send, to the identity management platform 315, the smart card certificate. For example, the user device 310 may send, to the identity management platform 315, a request for authentication of the user using the smart card (e.g., the PIV card). In other words, the user may use the user device 310 to read the smart card. The smart card reader may be embodied in the user device 310 and the user device 310 may be used to read the smart card. In such an example, the smart card may include the smart card certificate (e.g., the certificate, a digital certificate), which includes at least a certificate attribute configured for authentication of the user. The certificate attribute may be associated with a user attribute usable by the identity management platform 315 for authentication of the user for accessing the resource. That is, the smart card may have embedded therein a digital certificate comprising information identifying a digital identity of the user, which may be read by the user device 310.

In some examples, in response to receiving the smart card certificate (e.g., in response to receiving the request), the identity management platform 315 may verify the certificate. For example, the identity management platform 315 may facilitate verification of the certificate using a third-party IdP authentication integration or the identity management platform may autonomously verify the certificate. After (or upon) successful verification of the certificate, the identity management platform 315 may extract information from the certificate. For instance, the identity management platform 315 may extract information associated with one or more attributes of the certificate that are configured for use in authenticating users by the IdP (e.g., or the organization). The certificate attributes configured for use in authenticating users may differ depending on the organization, the user, or the IdP used for authenticating the user and may be identified using the configuration information. As discussed with respect to FIGS. 2A, 2B, 2C, and 2D, the configuration information may indicate which certificate attributes are to be used when authentication is performed by a particular IdP. Accordingly, the identity management platform 315 may use the configuration information to determine which of the certificate attributes may be extracted, and corresponding certificate attribute values may be extracted from the determined certificate attributes (e.g., may extract and persist properties (e.g., certificate attributes) from the certificate).

At step 325, the identity management platform 315 may identify a set of user personas associated with the user based on comparing a value of the certificate attribute to a respective value of the user attribute for one or more user personas of the multiple user personas associated with the user directory of the identity management platform 315. In some examples, a user name (e.g., entered during a sign-in process) may be used to match against a value of the certificate attribute. For example, the identity management platform 315 may use the extracted certificate attribute values and the configuration information to perform user persona matching. As discussed with respect to FIGS. 2A, 2B, 2C, and 2D, the configuration information may further indicate which attributes of the certificate map to which fields in the user directory maintained by the identity management platform 315. For example, the configuration information may indicate a certificate attribute (e.g., which certificate attribute) is to be matched with a user attribute (e.g., which user attribute, such as which corresponding field in the user directory). Accordingly, the identity management platform 315 may use the extracted certificate attribute value or values to search a corresponding field or fields in the user directory to identify one or more user profiles having user attribute values (e.g., values stored in the user directory fields) that match the extracted certificate attribute values. In some cases, such as when the user has multiple user personas associated with the certificate of the smart card, multiple user profiles may be maintained in the user directory. The user directory may store the multiple user profiles so that the user directory fields that correspond to the extracted certificate attributes share the same user attribute values across the multiple user profiles associated with the user. In this way, when the identity management platform 315 performs the user persona matching each of the user profiles associated with the single certificate of the smart card may be identified.

At step 330, the identity management platform 315 may send to the user device 310 an indication of the identified user personas associated with the certificate of the smart card. That is, the user device 310 may receive from the identity management platform 315 the indication of the identified user personas associated with the certificate of the smart card. In the case that multiple user personas were identified, the identity management platform 315 may output a list of the multiple user personas at a browser, application, user interface, or the like of the user device 310 (or a display device connected to the user device 310). For instance, the list of the multiple user personas may be output in a user interface associated with the IdP that the user selected or that was defaulted to for authentication. The list may include the usernames or other identifying information corresponding to the accounts associated with the multiple user personas.

In some examples, at step 335, the user device 310 may select (e.g., may receive an indication of a selection from the user) one of the multiple user personas output at the user device 310. In some cases, once selected, the user device 310 may output a prompt for the user to provide additional authentication information, such as a response to a challenge question or the like. The user device 310 may send to the identity management platform 315 an indication of the selected user persona and an encrypted version of the provided additional authentication information. In some other examples, the user device 310 may output the indication of the selected user persona to the identity management platform (e.g., without requesting additional authentication information from the user). For example, the identity management platform 315 may authenticate the user (e.g., autonomously).

At step 340, the identity management platform 315 may receive from the user device 310 the indication of the selected user persona (e.g., and the encrypted additional authentication information).

At step 345, the identity management platform may transmit, to the user device 310 in response to the indication of the selected user, an indication of an acknowledgement of the selection of the first user persona. In some examples, the indication may include an indication that the user has been successfully logged into an account associated with the selected first user persona. In some cases, user device 310 may additionally receive a message directing the user device 310 to an appropriate location for access to the request resource. In some cases, the requested access may be access to a physical space, such as a building or an office or the like, and the cloud client system may grant the requested access, such as by remotely unlocking a door or the like.

Figure 4:
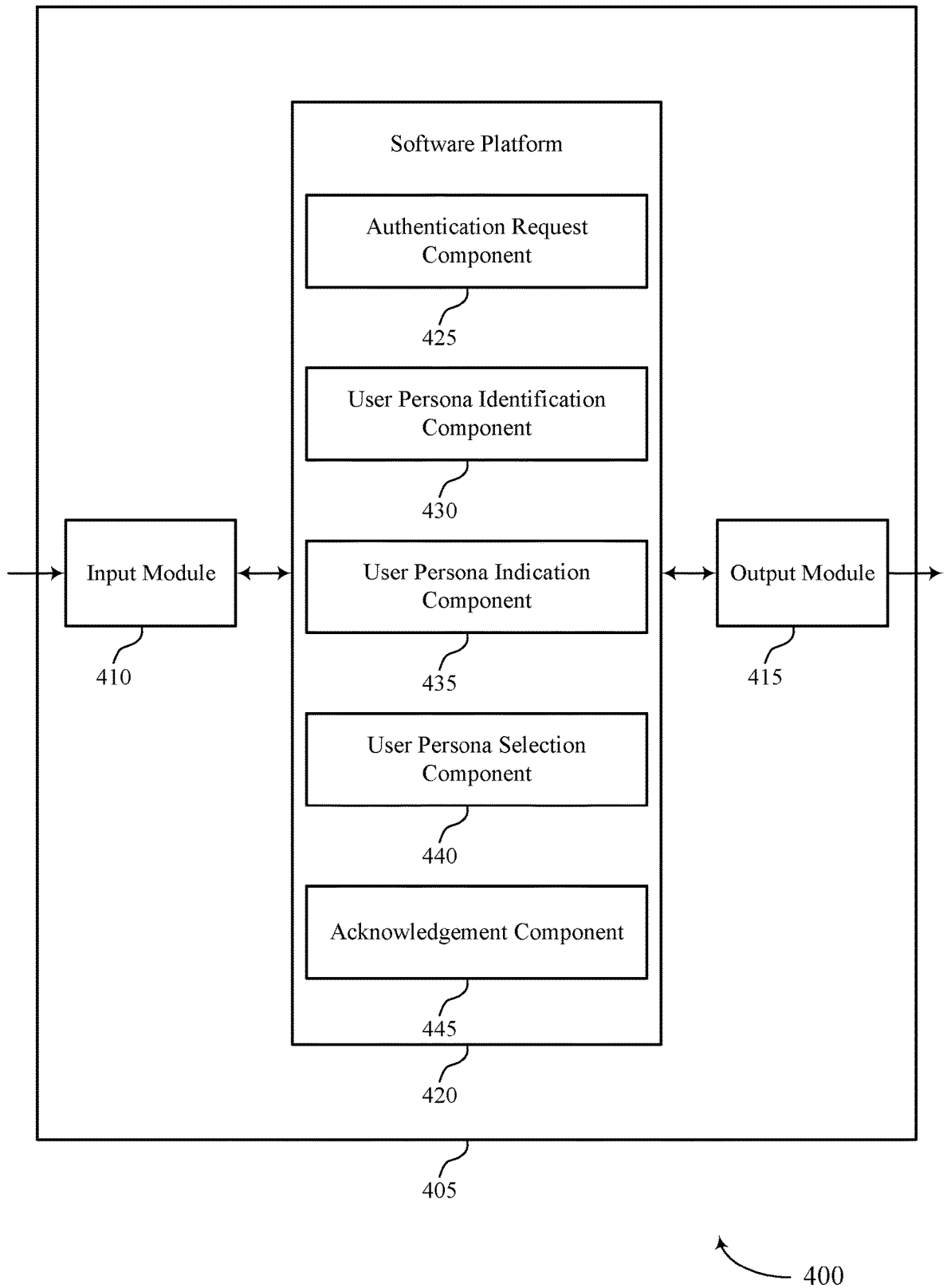
FIG. 4 shows a block diagram of an apparatus that supports techniques for mapping a smart card to multiple user personas in accordance with aspects of the present disclosure.

FIG. 4 shows a block diagram 400 of a device 405 that supports techniques for mapping a smart card to multiple user personas in accordance with aspects of the present disclosure. The device 405 may include an input module 410, an output module 415, and a software platform 420. The device 405, or one or more components of the device 405 (e.g., the input module 410, the output module 415, and the software platform 420), may include one or more processors, which may operate individually or collectively, and which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the software platform 420 to support techniques for mapping a smart card to multiple user personas. In some cases, the input module 410 may be a component of an I/O controller 610 as described with reference to FIG. 6.

The output module 415 may manage output signals for the device 405. For example, the output module 415 may receive signals from other components of the device 405, such as the software platform 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the software platform 420 may include an authentication request component 425, a user persona identification component 430, a user persona indication component 435, a user persona selection component 440, an acknowledgement component 445, or any combination thereof. In some examples, the software platform 420, or various components thereof, may be configured to perform various operations (e.g., receiving, monitoring, transmitting) using, or otherwise in cooperation with, the input module 410, the output module 415, or both. For example, the software platform 420 may receive information from the input module 410, send information to the output module 415, or be integrated in combination with the input module 410, the output module 415, or both to receive information, transmit information, or perform various other operations as described herein.

The software platform 420 may support user authentication in accordance with examples as disclosed herein. The authentication request component 425 may be configured to support a means for receiving, from a client device, a first request for authentication of a first user using a PIV card, where the PIV card includes a certificate that includes at least a certificate attribute configured for authentication of the first user, and where the certificate attribute is associated with a user attribute usable by an identity management platform for authentication of the first user. The user persona identification component 430 may be configured to support a means for identifying a set of user personas associated with the first user based on comparing a value of the certificate attribute to a respective value of the user attribute for one or more user personas of a set of multiple user personas associated with a user directory of the identity management platform. The user persona indication component 435 may be configured to support a means for transmitting, to the client device, a first indication of the set of user personas. The user persona selection component 440 may be configured to support a means for receiving, from the client device in response to the first indication, a second indication of a selection of a first user persona from among the set of user personas. The acknowledgement component 445 may be configured to support a means for transmitting, to the client device in response to the second indication, a third indication acknowledging the selection of the first user persona.

Figure 5:
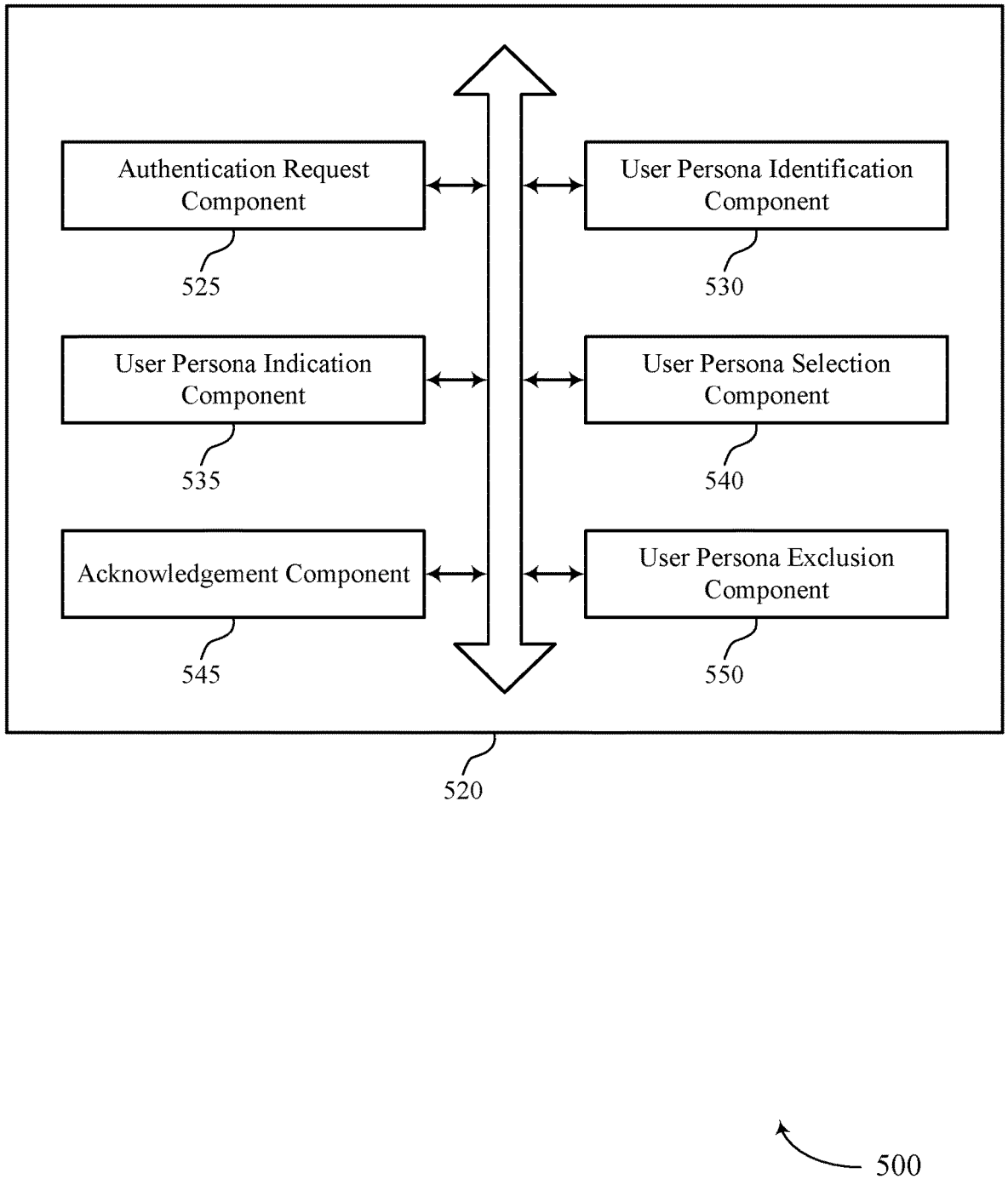
FIG. 5 shows a block diagram of a software platform that supports techniques for mapping a smart card to multiple user personas in accordance with aspects of the present disclosure.

FIG. 5 shows a block diagram 500 of a software platform 520 that supports techniques for mapping a smart card to multiple user personas in accordance with aspects of the present disclosure. The software platform 520 may be an example of aspects of a software platform or a software platform 420, or both, as described herein. The software platform 520, or various components thereof, may be an example of means for performing various aspects of techniques for mapping a smart card to multiple user personas as described herein. For example, the software platform 520 may include an authentication request component 525, a user persona identification component 530, a user persona indication component 535, a user persona selection component 540), an acknowledgement component 545, a user persona exclusion component 550, or any combination thereof. Each of these components, or components of subcomponents thereof (e.g., one or more processors, one or more memories), may communicate, directly or indirectly, with one another (e.g., via one or more buses).

The software platform 520 may support user authentication in accordance with examples as disclosed herein. The authentication request component 525 may be configured to support a means for receiving, from a client device, a first request for authentication of a first user using a PIV card, where the PIV card includes a certificate that includes at least a certificate attribute configured for authentication of the first user, and where the certificate attribute is associated with a user attribute usable by an identity management platform for authentication of the first user. The user persona identification component 530 may be configured to support a means for identifying a set of user personas associated with the first user based on comparing a value of the certificate attribute to a respective value of the user attribute for one or more user personas of a set of multiple user personas associated with a user directory of the identity management platform. The user persona indication component 535 may be configured to support a means for transmitting, to the client device, a first indication of the set of user personas. The user persona selection component 540 may be configured to support a means for receiving, from the client device in response to the first indication, a second indication of a selection of a first user persona from among the set of user personas. The acknowledgement component 545 may be configured to support a means for transmitting, to the client device in response to the second indication, a third indication acknowledging the selection of the first user persona.

In some examples, the set of user personas includes the first user persona and a second user persona. In some examples, the first user persona is associated with a first user account and the second user persona is associated with a second user account. In some examples, the first user account is associated with a first domain of a first organization and the second user account is associated with a second domain of a second organization. In some examples, at least one persona of the set of user personas is associated with temporary access to one or more resources of an organization, one or more services of the organization, or both.

In some examples, to support identifying the set of user personas, the user persona identification component 530 may be configured to support a means for identifying a first set of user personas associated with the first user based on comparing the value of the certificate attribute to the respective value of the user attribute for the one or more user personas. In some examples, to support identifying the set of user personas, the user persona exclusion component 550 may be configured to support a means for excluding at least one user persona from the first set of user personas to obtain a second set of user personas, where the at least one user persona is excluded based on an expiration of an access timer associated with the at least one user persona, the second set of user personas including the set of user personas.

In some examples, the certificate attribute includes a subject, an issuer and subject, an issuer and serial number, a subject key identifier, or a hash of a public key.

In some examples, the certificate includes a set of multiple certificate attributes including the certificate attribute.

Figure 6:
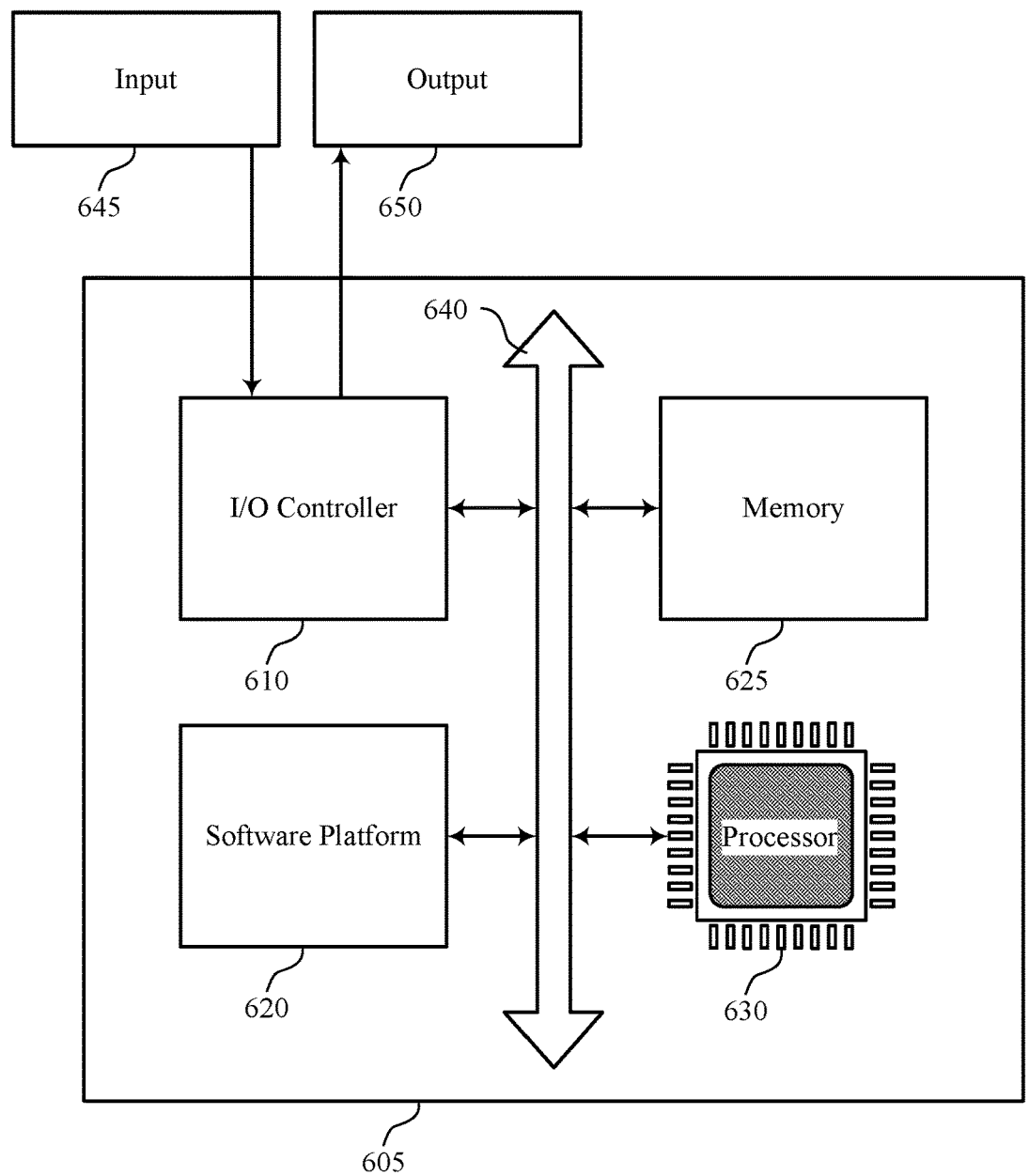
FIG. 6 shows a diagram of a system including a device that supports techniques for mapping a smart card to multiple user personas in accordance with aspects of the present disclosure.

FIG. 6 shows a diagram of a system 600 including a device 605 that supports techniques for mapping a smart card to multiple user personas in accordance with aspects of the present disclosure. The device 605 may be an example of, or include, the components of a device 405, as described herein. The device 605 may include components for bi-directional data communications including components for transmitting and receiving communications, such as a software platform 620, an I/O controller 610, one or more memories 625, and one or more processors 630. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

Memory 625 may include random-access memory (RAM) and ROM. The memory 625 may store computer-readable, computer-executable software including instructions that, when executed, cause at least one processor 630, individually or collectively, to perform various functions described herein. In some cases, the memory 625 may contain, among other things, a BIOS which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in the one or more memories 625 to perform various functions (e.g., functions or tasks supporting techniques for mapping a smart card to multiple user personas). The processor 630 may be an example of a single processor or multiple processors. For example, the device 605 may include one or more processors 630.

The software platform 620 may support user authentication in accordance with examples as disclosed herein. For example, the software platform 620 may be configured to support a means for receiving, from a client device, a first request for authentication of a first user using a PIV card, where the PIV card includes a certificate that includes at least a certificate attribute configured for authentication of the first user, and where the certificate attribute is associated with a user attribute usable by an identity management platform for authentication of the first user. The software platform 620 may be configured to support a means for identifying a set of user personas associated with the first user based on comparing a value of the certificate attribute to a respective value of the user attribute for one or more user personas of a set of multiple user personas associated with a user directory of the identity management platform. The software platform 620 may be configured to support a means for transmitting, to the client device, a first indication of the set of user personas. The software platform 620 may be configured to support a means for receiving, from the client device in response to the first indication, a second indication of a selection of a first user persona from among the set of user personas. The software platform 620 may be configured to support a means for transmitting, to the client device in response to the second indication, a third indication acknowledging the selection of the first user persona.

By including or configuring the software platform 620 in accordance with examples as described herein, the device 605 may support techniques for improved user experience related to reduced processing, more efficient utilization of computing resources, and improved coordination between devices.

Figure 7:
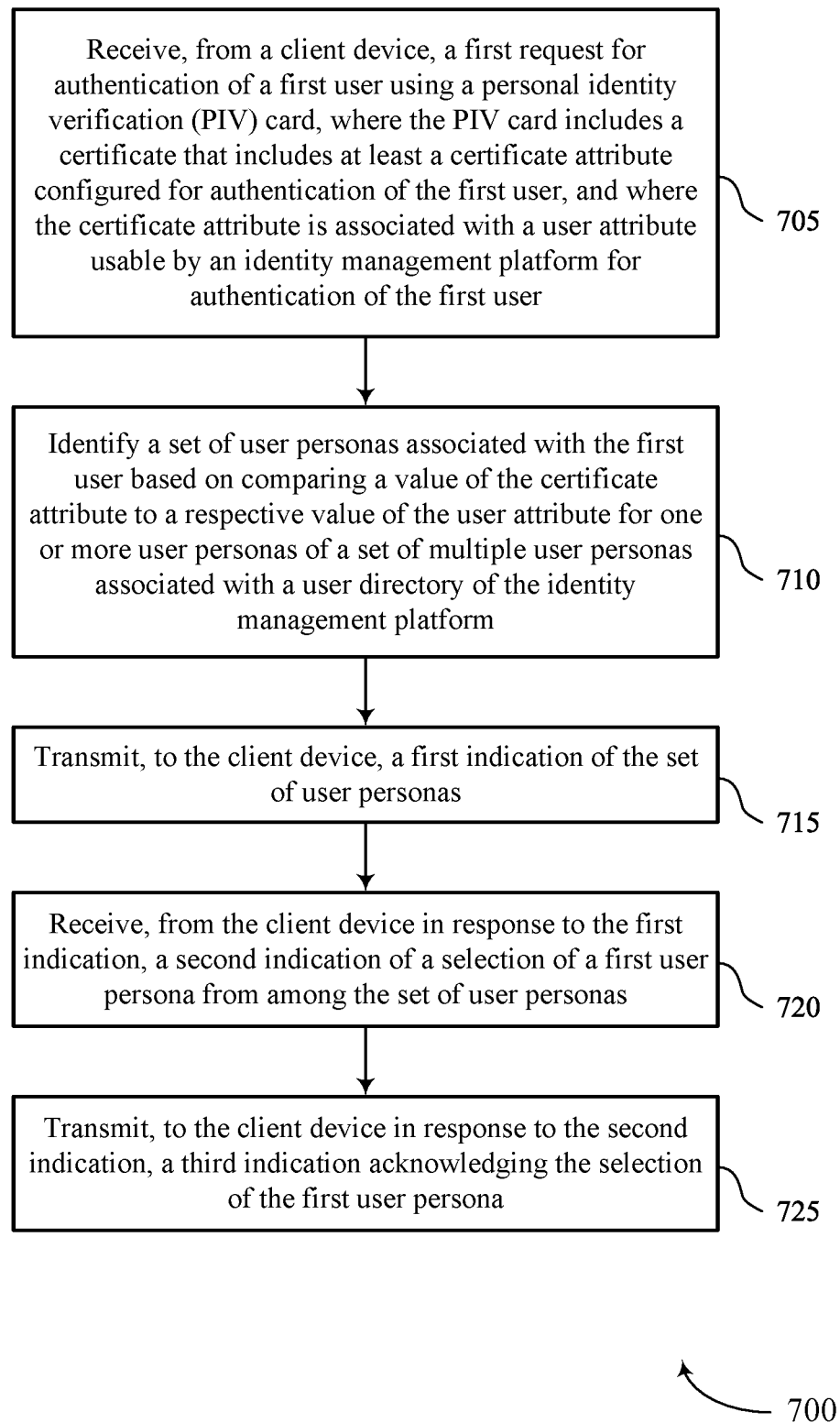
FIG. 7 shows a flowchart illustrating methods that support techniques for mapping a smart card to multiple user personas in accordance with aspects of the present disclosure.

FIG. 7 shows a flowchart illustrating a method 700 that supports techniques for mapping a smart card to multiple user personas in accordance with aspects of the present disclosure. The operations of the method 700 may be implemented by a device or its components as described herein. For example, the operations of the method 700 may be performed by a device as described with reference to FIGS. 1 through 6. In some examples, a device may execute a set of instructions to control the functional elements of the device to perform the described functions. Additionally, or alternatively, the device may perform aspects of the described functions using special-purpose hardware.

At 705, the method may include receiving, from a client device, a first request for authentication of a first user using a PIV card, where the PIV card includes a certificate that includes at least a certificate attribute configured for authentication of the first user, and where the certificate attribute is associated with a user attribute usable by an identity management platform for authentication of the first user. The operations of block 705 may be performed in accordance with examples as disclosed herein. In some examples, aspects of the operations of 705 may be performed by an authentication request component 525 as described with reference to FIG. 5.

At 710, the method may include identifying a set of user personas associated with the first user based on comparing a value of the certificate attribute to a respective value of the user attribute for one or more user personas of a set of multiple user personas associated with a user directory of the identity management platform. The operations of block 710 may be performed in accordance with examples as disclosed herein. In some examples, aspects of the operations of 710 may be performed by a user persona identification component 530 as described with reference to FIG. 5.

At 715, the method may include transmitting, to the client device, a first indication of the set of user personas. The operations of block 715 may be performed in accordance with examples as disclosed herein. In some examples, aspects of the operations of 715 may be performed by a user persona indication component 535 as described with reference to FIG. 5.

At 720, the method may include receiving, from the client device in response to the first indication, a second indication of a selection of a first user persona from among the set of user personas. The operations of block 720 may be performed in accordance with examples as disclosed herein. In some examples, aspects of the operations of 720 may be performed by a user persona selection component 540 as described with reference to FIG. 5.

At 725, the method may include transmitting, to the client device in response to the second indication, a third indication acknowledging the selection of the first user persona. The operations of block 725 may be performed in accordance with examples as disclosed herein. In some examples, aspects of the operations of 725 may be performed by an acknowledgement component 545 as described with reference to FIG. 5.

The following provides an overview of aspects of the present disclosure:

Aspect 1: A method for user authentication at a device, comprising: receiving, from a client device, a first request for authentication of a first user using a PIV card, wherein the PIV card comprises a certificate that includes at least a certificate attribute configured for authentication of the first user, and wherein the certificate attribute is associated with a user attribute usable by an identity management platform for authentication of the first user: identifying a set of user personas associated with the first user based at least in part on comparing a value of the certificate attribute to a respective value of the user attribute for one or more user personas of a plurality of user personas associated with a user directory of the identity management platform: transmitting, to the client device, a first indication of the set of user personas: receiving, from the client device in response to the first indication, a second indication of a selection of a first user persona from among the set of user personas; and transmitting, to the client device in response to the second indication, a third indication acknowledging the selection of the first user persona.

Aspect 2: The method of aspect 1, wherein the set of user personas comprises the first user persona and a second user persona, and the first user persona is associated with a first user account and the second user persona is associated with a second user account.

Aspect 3: The method of aspect 2, wherein the first user account is associated with a first domain of a first organization and the second user account is associated with a second domain of a second organization.

Aspect 4: The method of any of aspects 1 through 3, wherein at least one persona of the set of user personas is associated with temporary access to one or more resources of an organization, one or more services of the organization, or both.

Aspect 5: The method of any of aspects 1 through 4, wherein identifying the set of user personas comprises: identifying a first set of user personas associated with the first user based at least in part on comparing the value of the certificate attribute to the respective value of the user attribute for the one or more user personas; and excluding at least one user persona from the first set of user personas to obtain a second set of user personas, wherein the at least one user persona is excluded based at least in part on an expiration of an access timer associated with the at least one user persona, the second set of user personas comprising the set of user personas.

Aspect 6: The method of any of aspects 1 through 5, wherein the certificate attribute comprises a subject, an issuer and subject, an issuer and serial number, a subject key identifier, or a hash of a public key.

Aspect 7: The method of any of aspects 1 through 6, wherein the certificate comprises a plurality of certificate attributes including the certificate attribute.

Aspect 8: A device for user authentication, comprising one or more memories storing processor-executable code, and one or more processors coupled with the one or more memories and individually or collectively operable to execute the code to cause the device to perform a method of any of aspects 1 through 7.

Aspect 9: A device for user authentication, comprising at least one means for performing a method of any of aspects 1 through 7.

Aspect 10: A non-transitory computer-readable medium storing code for user authentication, the code comprising instructions executable by a processor to perform a method of any of aspects 1 through 7.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one." "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components." and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for user authentication at a device, comprising:
   receiving, from a client device, a first request for an authentication of a first user using a personal identity verification (PIV) card, wherein the PIV card comprises a certificate that includes at least a certificate attribute configured for the authentication of the first user, and wherein the certificate attribute is associated with a user attribute usable by an identity management platform for the authentication of the first user;
   identifying a set of user personas associated with the first user based at least in part on comparing a value of the certificate attribute to a respective value of the user attribute for one or more user personas of a plurality of user personas associated with a user directory of the identity management platform;
   transmitting, to the client device, a first indication of the set of user personas;
   receiving, from the client device in response to the first indication, a second indication of a selection of a first user persona from among the set of user personas, wherein the second indication comprises authentication information for the first user persona that is indicated as selected via the second indication; and
   transmitting, to the client device in response to the second indication, a third indication acknowledging the selection of the first user persona.

2. The method of claim 1, wherein the set of user personas comprises the first user persona and a second user persona, and wherein the first user persona is associated with a first user account and the second user persona is associated with a second user account.

3. The method of claim 2, wherein the first user account is associated with a first domain of a first organization and the second user account is associated with a second domain of a second organization.

4. The method of claim 1, wherein at least one persona of the set of user personas is associated with temporary access to one or more resources of an organization, one or more services of the organization, or both.

5. The method of claim 1, wherein identifying the set of user personas comprises:
   identifying a first set of user personas associated with the first user based at least in part on comparing the value of the certificate attribute to the respective value of the user attribute for the one or more user personas; and
   excluding at least one user persona from the first set of user personas to obtain a second set of user personas, wherein the at least one user persona is excluded based at least in part on an expiration of an access timer associated with the at least one user persona, the second set of user personas comprising the set of user personas.

6. The method of claim 1, wherein the certificate attribute comprises a subject, an issuer, a serial number, a subject key identifier, a hash of a public key, or any combination thereof.

7. The method of claim 1, wherein the certificate comprises a plurality of certificate attributes including the certificate attribute.

8. A device for user authentication, comprising:
   one or more memories storing processor-executable code; and
   one or more processors coupled with the one or more memories and individually or collectively operable to execute the code to cause the device to:
   receive, from a client device, a first request for an authentication of a first user using a personal identity verification (PIV) card, wherein the PIV card comprises a certificate that includes at least a certificate attribute configured for the authentication of the first user, and wherein the certificate attribute is associated with a user attribute usable by an identity management platform for the authentication of the first user;
   identify a set of user personas associated with the first user based at least in part on comparing a value of the certificate attribute to a respective value of the user attribute for one or more user personas of a plurality of user personas associated with a user directory of the identity management platform;
   transmit, to the client device, a first indication of the set of user personas;
   receive, from the client device in response to the first indication, a second indication of a selection of a first user persona from among the set of user personas, wherein the second indication comprises authentication information for the first user persona that is indicated as selected via the second indication; and
   transmit, to the client device in response to the second indication, a third indication acknowledging the selection of the first user persona.

9. The device of claim 8, wherein the set of user personas comprises the first user persona and a second user persona, and wherein the first user persona is associated with a first user account and the second user persona is associated with a second user account.

10. The device of claim 9, wherein the first user account is associated with a first domain of a first organization and the second user account is associated with a second domain of a second organization.

11. The device of claim 8, wherein at least one persona of the set of user personas is associated with temporary access to one or more resources of an organization, one or more services of the organization, or both.

12. The device of claim 8, wherein, to identify the set of user personas, the one or more processors are individually or collectively operable to execute the code to cause the device to:
   identify a first set of user personas associated with the first user based at least in part on comparing the value of the certificate attribute to the respective value of the user attribute for the one or more user personas; and
   exclude at least one user persona from the first set of user personas to obtain a second set of user personas, wherein the at least one user persona is excluded based at least in part on an expiration of an access timer associated with the at least one user persona, the second set of user personas comprising the set of user personas.

13. The device of claim 8, wherein the certificate attribute comprises a subject, an issuer, a serial number, a subject key identifier, a hash of a public key, or any combination thereof.

14. The device of claim 8, wherein the certificate comprises a plurality of certificate attributes including the certificate attribute.

15. A non-transitory computer-readable medium storing code for user authentication, the code comprising instructions executable by one or more processors to:
   receive, from a client device, a first request for an authentication of a first user using a personal identity verification (PIV) card, wherein the PIV card comprises a certificate that includes at least a certificate attribute configured for the authentication of the first user, and wherein the certificate attribute is associated with a user attribute usable by an identity management platform for the authentication of the first user;

identify a set of user personas associated with the first user based at least in part on comparing a value of the certificate attribute to a respective value of the user attribute for one or more user personas of a plurality of user personas associated with a user directory of the identity management platform;

transmit, to the client device, a first indication of the set of user personas;

receive, from the client device in response to the first indication, a second indication of a selection of a first user persona from among the set of user personas, wherein the second indication comprises authentication information for the first user persona that is indicated as selected via the second indication; and transmit, to the client device in response to the second indication, a third indication acknowledging the selection of the first user persona.

16. The non-transitory computer-readable medium of claim 15, wherein the set of user personas comprises the first user persona and a second user persona, and wherein the first user persona is associated with a first user account and the second user persona is associated with a second user account.

17. The non-transitory computer-readable medium of claim 16, wherein the first user account is associated with a first domain of a first organization and the second user account is associated with a second domain of a second organization.

18. The non-transitory computer-readable medium of claim 15, wherein at least one persona of the set of user personas is associated with temporary access to one or more resources of an organization, one or more services of the organization, or both.

19. The non-transitory computer-readable medium of claim 15, wherein the instructions to identify the set of user personas are executable by the one or more processors to:

identify a first set of user personas associated with the first user based at least in part on comparing the value of the certificate attribute to the respective value of the user attribute for the one or more user personas; and exclude at least one user persona from the first set of user personas to obtain a second set of user personas, wherein the at least one user persona is excluded based at least in part on an expiration of an access timer associated with the at least one user persona, the second set of user personas comprising the set of user personas.

20. The non-transitory computer-readable medium of claim 15, wherein the certificate attribute comprises a subject, an issuer, a serial number, a subject key identifier, a hash of a public key, or any combination thereof.

* * * * *